F. J. FITCH & G. BAUSBACK.
AUTOMATIC COUPLING DEVICE.
APPLICATION FILED FEB. 20, 1912.
1,034,352.
Patented July 30, 1912.
3 SHEETS—SHEET 1.
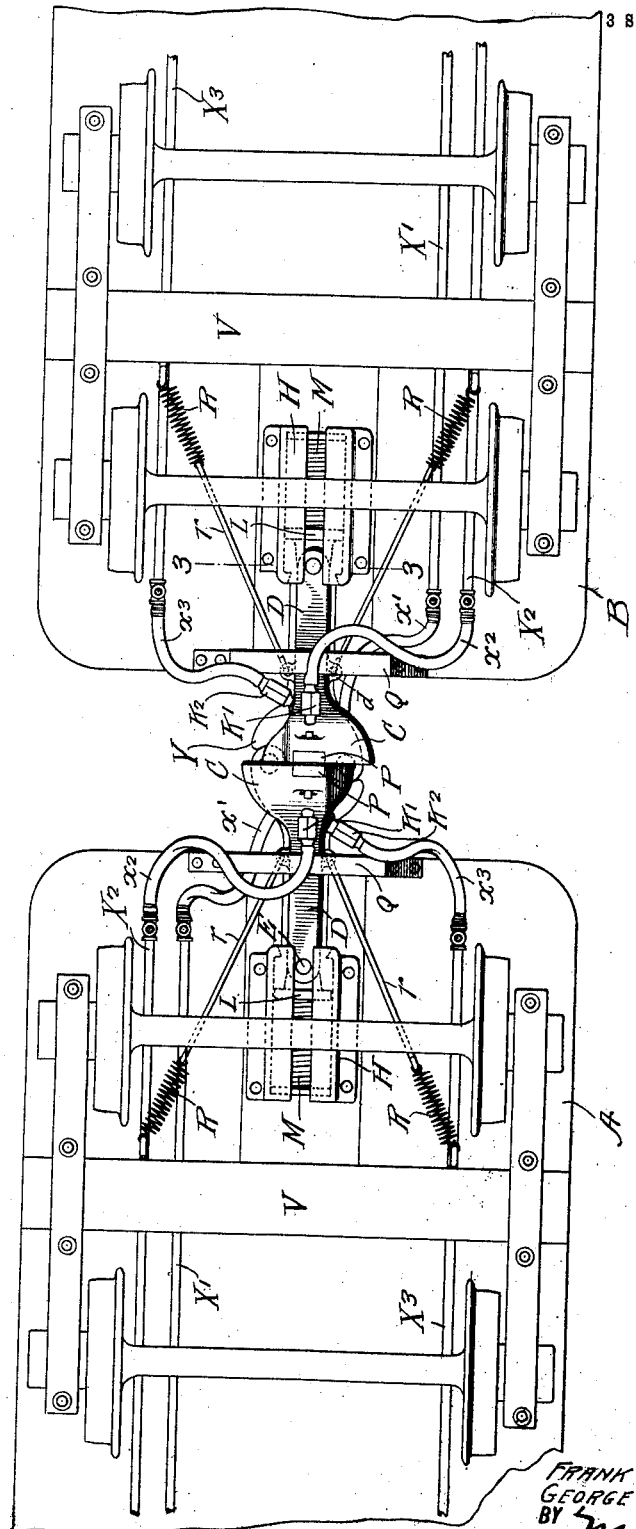
WITNESSES
INVENTORS
FRANK J. FITCH
GEORGE BAUSBACK,
BY
ATTORNEYS

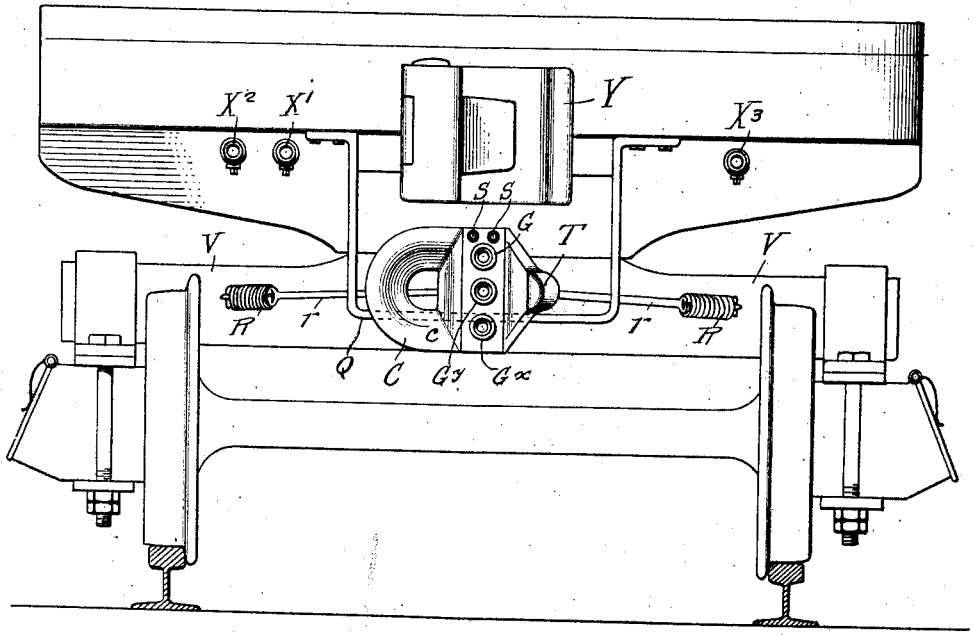
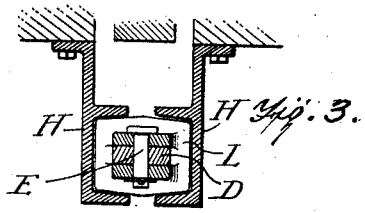
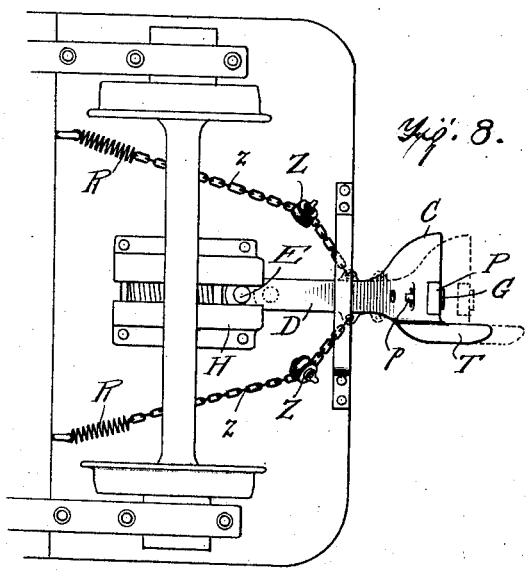

F. J. FITCH & G. BAUSBACK.
AUTOMATIC COUPLING DEVICE.
APPLICATION FILED FEB. 20, 1912.
1,034,352.
Patented July 30, 1912.
3 SHEETS—SHEET 3.
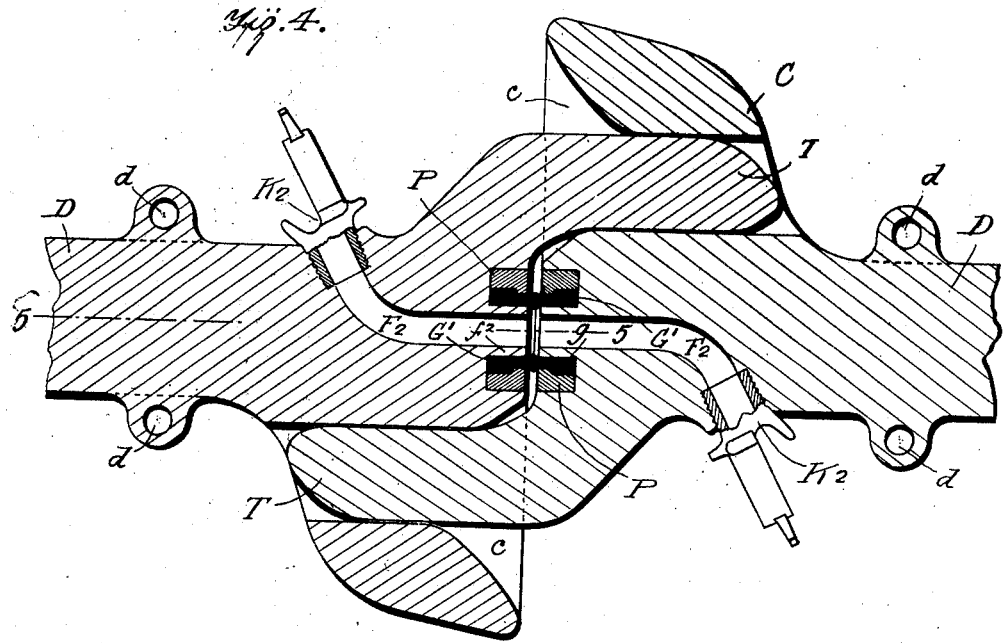
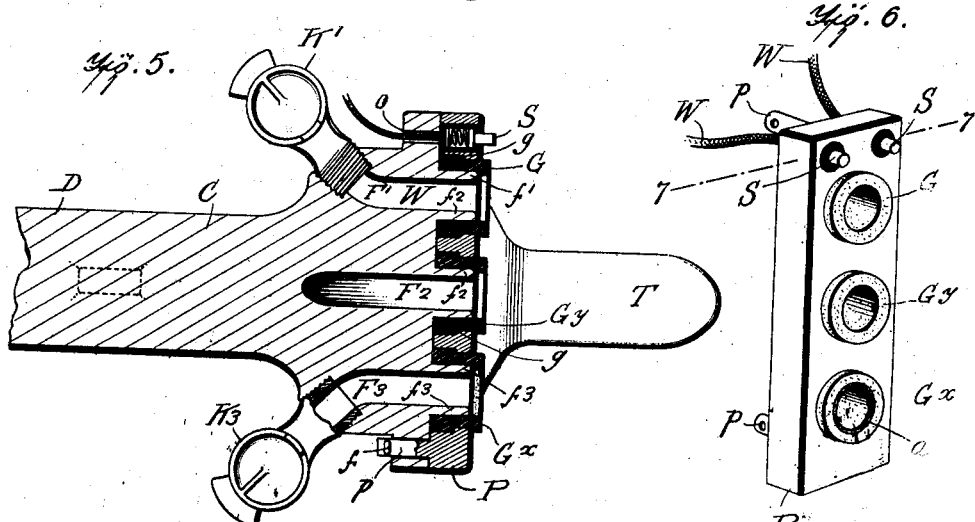
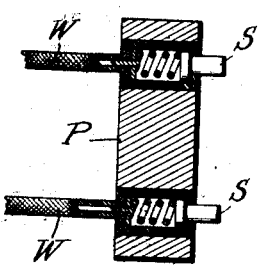
WITNESSES
INVENTORS
FRANK J. FITCH,
GEORGE BAUSBACK,
BY
ATTORNEYS

UNITED STATES PATENT OFFICE.

FRANK J. FITCH AND GEORGE BAUSBACK, OF POTTSVILLE, PENNSYLVANIA.

AUTOMATIC COUPLING DEVICE.

1,034,352.  Specification of Letters Patent.  Patented July 30, 1912.

Application filed February 20, 1912. Serial No. 678,774.

*To all whom it may concern:*

Be it known that we, FRANK J. FITCH and GEORGE BAUSBACK, citizens of the United States, and residents of Pottsville, in the county of Schuylkill and State of Pennsylvania, have made certain new and useful Improvements in Automatic Coupling Devices, of which the following is a specification.

Our invention relates to improvements in automatic coupling devices, and it consists in the constructions, combinations, and arrangements herein described and claimed.

An object of our invention is to provide a device which will automatically connect the main train pipe section, the steam pipes for heating the cars, and air pipe for signaling purposes and electric circuits for lighting or signaling.

A further object of our invention is to provide a coupling head having a removable plate in which the gaskets are disposed, thereby facilitating the removal and replacement of the gaskets.

A further object of our invention is to provide means for directing the coupling heads so that they will turn simultaneously with the turning of the wheels. We effect this by mounting the coupling devices upon a pivot and connecting them with the trucks in such a manner that the coupling heads will be turned in the proper direction even though the wheels may be on a curved track.

A further object of our invention is to provide automatic means for effecting the coupling of the train pipe, steam pipe, etc., part of these means consisting in the ordinary hose pipe connections so that in case one of the cars should not be equipped with our improved automatic coupling device, the connection could be effected manually in the ordinary manner.

Other objects and advantages will appear in the following specification, and the novel features of the device will be particularly pointed out in the appended claims.

Our invention is illustrated in the accompanying drawings forming part of this application in which similar reference characters indicate like parts in the several views, and in which—

Figure 1 is a bottom view of the device as applied to cars, Fig. 2 is a front view of the device, Fig. 3 is a section along the line 3—3 of Fig. 1, Fig. 4 is an enlarged section through two coupler heads in their operative positions, Fig. 5 is a section along the line 5—5 of Fig. 4, Fig. 6 is a perspective view of the gasket holding plate, Fig. 7 is a section approximately along the line 7—7 of Fig. 6, and Fig. 8 is a modified form showing one of the coupler heads in its operative position.

Referring now to Fig. 1 A denotes in general one car and B another. Each of these cars is equipped with a coupling head such as that shown at C. A description of one of these heads will suffice, since they are all precisely the same. The head consists of a body portion C having a recess $c$ of the shape shown in Figs. 2 and 4, this recess tapering inwardly as shown. On the opposite side of the head is a tongue T arranged to enter the recess $c$ so as to guide the intermediate portion of the head through which the air and steam conduits pass into proper position for uniting the conduits in the two heads.

Between the recess $c$ and the tongue T of each coupler head is a recess arranged to receive a plate such as that shown at P in Fig. 6. This plate is provided with pins $p$ adapted to extend through a portion of the coupler head as shown in Fig. 5, and to be secured to the head by means of cotter pins $f$, thus holding the plate securely in position. This plate P is preferably made of wrought iron and is perforated in the manner shown in Fig. 5 to provide openings for the resilient gaskets G, $G^y$ and $G^x$. These gaskets are preferably provided with shoulders $g$ to prevent their slipping out. The body portion C of the head is provided with three cylindrical integral extensions $f'$, $f^2$ and $f^3$ which form in fact terminal pipes for the three passages $F'$, $F^2$, and $F^3$ respectively. The gasket $G^x$ of the steam passage $F^3$ is preferably lined with a heat resisting material $a$ such as asbestos, in order to prevent the destruction of the gasket by the high temperature of the steam. The passages $F'$ and $F^3$ extend through the head and communicate with the ordinary coupling devices of the cam type, as shown at $K'$ and $K^3$ in Fig. 5, while the central passage $F^2$ is connected with a similar coupling $K^2$. The plate B also carries a pair of spring-pressed terminals such as those shown at S, these terminals being in electrical connection with the wires W which pass through openings o in the plate C, as shown in Fig. 5.

Referring now to Figs. 1 and 3, it will be seen that to the bottom of the car, such as B, is secured a housing H, which forms a guide for a head L, which is normally thrust forward by a spring M. Pivotally connected to the head L by a pin E is the coupler arm D which bears the head C. This permits the coupler head to have a lateral movement. The outer end of the arm D is supported by a plate Q, which is secured to the bottom of the car. Attached to eyes $d$ on each side of the arm D are rods $r$ which in turn are secured to springs R, the ends of the springs being attached to the trucks V.

Each car is provided with an air signal pipe $X'$, a main train pipe $X^2$, and a steam pipe $X^3$ which are connected by the hose pipes $x'$, $x^2$ and $x^3$ to the coupling heads $K'$, $K^2$ and $K^3$, respectively, when the automatic coupling device is being used. The parts being then in their normal positions, as shown in the drawing, it is obvious that when two cars come together the tongues T will enter the recesses $c$ in the companion coupling head for centering these parts, and that on the coupling of the cars by the coupler Y (see Fig. 2) the coupling C will be pressed inwardly against the tension of the springs M. Furthermore, the coupling heads will center so that the gaskets $G'$ $G^2$, $G^3$, etc., will be pressed together in the manner shown in Fig. 4, and the respective passages will register, thereby forming a complete connection through the coupling heads, of the pipes for the steam, the pipes for the main train line and the pipes for the air which operates the signal. Moreover, the contacts $s$ on each coupling head will come into engagement with the companion contacts on the opposite head, thereby completing the electric connections between the wires W in the two heads. The action of the springs will then hold the heads firmly together so that there is no danger of leakage of steam or air or any danger of breaking the electrical circuit through the contacts S. If the cars should happen to be on a curved portion of the track then the coupling heads will be turned by their connection with the trucks so as to maintain a position midway between the wheels. In other words, no matter whether the track is curved or straight, the coupling heads C are always in a position to engage the companion head on the adjacent car.

In Fig. 8 we have shown a modified means of moving the coupling heads when trucks are turned from their normal position by the curvature of the track. This construction consists of the employment of pulleys Z attached to the bottom of the car, over which chains $z$ pass to the springs R. This construction is used in certain freight cars in which the use of the rod $r$ would be difficult.

The advantages which arise from our invention are at once apparent. The wrought iron plate P may be easily removed by taking out the cotter pins and pulling the plate outwardly and the gaskets G, $G^y$ and $G^x$ may be removed and replaced in a minimum of time. The gaskets are held firmly in place by the shoulders $g$, and there is never the danger of a gasket working loose as in the ordinary construction. This and other advantages are at once apparent.

If it should be desirable or necessary to connect a car having our improved coupling device with one which is not so provided, then the hose pipes $x'$, $x^2$ and $x^3$ may be connected directly to the corresponding pipes, since they are provided with the usual coupling heads such as $K'$, $K^2$ and $K^3$ already described.

We are aware that various forms of the device based upon the same general plan might be made, but we consider as our own all such modifications as fairly fall within the spirit and the scope of the invention.

We claim:

1. A coupling head having a guide recess, a centering tongue and a central recess between said guide recess and said tongue, a removable plate disposed in said central recess, said removable plate being provided with gasket openings, resilient gaskets in said openings, spring contacts carried by said plate, and means for securing said plate to said head, said means comprising integral pins carried by the plate and arranged to extend through portions of said head, and cotter pins for holding said integral pins in place.

2. The combination with a pair of cars, each provided with a series of pipes, and a hose connection at the end of each pipe, of a coupling head pivotally carried by each car, said coupling head comprising a guide recess, a centering tongue, and a central recess between said guide recess and said tongue, a removable metal plate disposed in said central recess and provided with openings for the reception of gaskets, said head being provided with a plurality of passages, each of said passages communicating at one end with one of the openings in said plate and a stationary coupling member carried by said coupling head at the opposite end of each passage, each of said hose members being connected with one of said last named coupling members, and means connected with the trucks of each car for swinging its coupling head into operative alinement.

3. The combination with a pair of cars, each provided with a series of pipes, and a hose connection at the end of each pipe, of a coupling head pivotally carried by each car, said coupling head comprising a guide recess, a centering tongue, and a central recess between said guide recess and said tongue, a removable metal plate disposed in said central recess and provided with openings for the reception of gaskets, said head being provided with a plurality of passages, each of said passages communicating at one end with one of the openings in said plate and a stationary coupling member carried by said coupling head at the opposite end of each passage, each of said hose members being connected with one of said last named coupling members, and means connected with the trucks of each car for swinging its coupling head into operative alinement, said means comprising spring connections between said coupling head and the trucks.

FRANK J. FITCH.
GEORGE BAUSBACK.

Witnesses:
M. C. KREIDER,
SDIEIF SAPIRO.

Copies of this patent may be obtained for five cents each, by addressing the "Commissioner of Patents, Washington, D. C."